United States Patent
Corda et al.

(10) Patent No.: US 9,208,483 B2
(45) Date of Patent: Dec. 8, 2015

(54) SHARING OR RESELLING NFC APPLICATIONS AMONG MOBILE COMMUNICATIONS DEVICES

(75) Inventors: Alexandre Corda, Meudon (FR); Jonathan Azoulai, Meudon (FR); Vincent Lemonnier, Meudon (FR)

(73) Assignee: GEMALTO SA, Meudon (FR)

( * ) Notice: Subject to any disclaimer, the term of this patent is extended or adjusted under 35 U.S.C. 154(b) by 1268 days.

(21) Appl. No.: 12/741,760

(22) PCT Filed: Nov. 5, 2008

(86) PCT No.: PCT/IB2008/054613
§ 371 (c)(1),
(2), (4) Date: Sep. 7, 2010

(87) PCT Pub. No.: WO2009/060393
PCT Pub. Date: May 14, 2009

(65) Prior Publication Data
US 2010/0323681 A1 Dec. 23, 2010

(30) Foreign Application Priority Data
Nov. 6, 2007 (EP) .................................... 07291329

(51) Int. Cl.
*G06Q 20/00* (2012.01)
*G06Q 30/00* (2012.01)
(Continued)

(52) U.S. Cl.
CPC .......... *G06Q 20/1235* (2013.01); *G06Q 20/223* (2013.01); *G06Q 20/322* (2013.01);
(Continued)

(58) Field of Classification Search
CPC .................................................. G06Q 20/1235
USPC ....................................................... 705/51–59
See application file for complete search history.

(56) References Cited

U.S. PATENT DOCUMENTS 5,594,227 A * 1/1997 Deo .............................. 235/380
5,629,980 A * 5/1997 Stefik et al. ..................... 705/54
(Continued)

FOREIGN PATENT DOCUMENTS

EP        1 248 188 A1 *  9/2002  ................ G06F 9/06
WO        WO0118746 A1     3/2001
(Continued)

OTHER PUBLICATIONS

Nordlund S. "Secure Over-the-Air Services in NFC Ecosystems" NFC Applications Conference Hagneberg, Mar. 20, 2007 XP002470503 p. 11,18;19,22,23.
(Continued)

*Primary Examiner* — Calvin L Hewitt, II
*Assistant Examiner* — Cristina Sherr
(74) *Attorney, Agent, or Firm* — The Jansson Firm; Pehr B. Jansson

(57) ABSTRACT

A method for sharing applications (APPI, APP2, APPx; APP4) being stored in a source mobile communication device (MOx; MOI) with a destination mobile communication device (MO1; MOx) comprises: transmitting a sharing request (SR) from the source mobile communication device (MOx; MO1) to a Trusted Service Manager (TSM) with information about the application and the destination mobile communication device (MO1; MOx); at the Trusted Service Manager (TSM), retrieving the Service Provider (SP1, SP2, SPx) that has provided said application and sending a query (QU) to it; at the Service Provider (SP1, SP2, SPx), sending an installation request (INST) to the Trusted Service Manager (TSM) with an adapted version (APPx') of the application and update instructions (UPD) for the source mobile communication device (MOx; MO1); at the Trusted Service Manager (TSM), getting the adapted application (APPx') installed in the destination mobile communication device (MO1; MOx) and updating the source mobile communication device (MOx; MO1).

6 Claims, 2 Drawing Sheets

(51) Int. Cl.

| | |
|---|---|
| *G06Q 20/12* | (2012.01) |
| *G06Q 20/22* | (2012.01) |
| *G06Q 20/32* | (2012.01) |
| *G06Q 20/34* | (2012.01) |
| *G06Q 30/06* | (2012.01) |
| *H04L 29/08* | (2006.01) |
| *H04W 4/00* | (2009.01) |
| *H04W 12/02* | (2009.01) |

(52) U.S. Cl.
CPC ........ *G06Q20/3278* (2013.01); *G06Q 20/3552* (2013.01); *G06Q 20/3574* (2013.01); *G06Q 30/0601* (2013.01); *H04L 67/34* (2013.01); *H04W 4/001* (2013.01); *H04W 4/008* (2013.01); *H04W 12/02* (2013.01)

(56) References Cited

U.S. PATENT DOCUMENTS 8,433,693 B2 * 4/2013 Rasmussen ................ 707/704
2004/0192282 A1    9/2004 Vasudevan
2005/0222961 A1 * 10/2005 Staib et al. .................. 705/64
2010/0291896 A1 * 11/2010 Corda ........................ 455/410

FOREIGN PATENT DOCUMENTS

WO      2005/098769 A    10/2005
WO      WO2009060393 A2  11/2008

OTHER PUBLICATIONS

GSMA: "mobile NEC technical guidelines—version 2.0" Internet Citation, [Online] Nov. 1, 2007 pp. 1-95, XP002495767 http://www.gsmworld.com/documents/nfc/gsma_nfc2_wp.pdf> p. 4, line 1-p. 6, last line p. 29, line 1-p.35, last line. Fig 1, 10-12.

PCT/IB2008/053828 International Search Report, Dec. 22, 2008, European Patent Office, P.B. 5818 Patentlaan 2 NL—2280 HV Rijswijk.

PCT/IB2008/054613 International Search Report, Apr. 22, 2009, European Patent Office, P.B. 5818 Patentiaan 2 NL—2280 HV Rijswijk.

* cited by examiner

SHARING OR RESELLING NFC APPLICATIONS AMONG MOBILE COMMUNICATIONS DEVICES

FIELD OF THE INVENTION

The invention relates to a method for sharing or reselling NFC applications being stored in a source mobile communication device with or to a destination mobile communication device.

The invention further relates to a telecommunication system comprising at least one Service Provider, at least one Trusted Service Manager and a plurality of mobile communication devices, e.g. NFC mobile phones, being equipped to store NFC applications of the Service Providers.

The invention further relates to a Trusted Service Manager.

The invention further relates to a Service Provider.

The invention further relates to a computer program product directly loadable into the memory of a mobile communication device being equipped with a memory device.

The invention further relates to a mobile communication device being adapted to process the computer program product mentioned in the above paragraph.

BACKGROUND OF THE INVENTION

There are mobile communication devices known which contain memory devices having unique memory device identifications, e.g. the MIFARE® classic family, developed by NXP Semiconductors, a contactless smart card IC operating in the 13.56 MHz frequency range with read/write capability. Recently, secure memory elements have been developed which are memory devices providing enhanced security features, particularly for the use in mobile phones and other mobile communication devices with Near Field Communication (NFC) capabilities. Said secure memory elements are also known as "Smard Cards". One of the leading representatives of these secure memory elements is the SmartMX (Memory eXtension) smart card family that has been designed by NXP Semiconductors for high-security smart card applications requiring highly reliable solutions, with or without multiple interface options. Key applications are e-government, banking/finance, mobile communications and advanced public transportation. SmartMX architecture combines coprocessors for RSA, ECC, DES and AES and enables implementation of operating systems including Java Open Platform and MULTOS. The ability of SmartMX cards to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security.

In February 2007 the GSM Association (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

Reader Manufacturer—produces NFC reader devices.

Application developer—designs and develops the Mobile NFC applications.

Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC ecosystem is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

Service Providers like banks, public transport companies, loyalty programs owners etc. provide contactless services to their subscribed customers who use these services in their mobile communication devices, e.g. NFC mobile phones. Contactless services comprise e.g. the provision of transport passes, cinema tickets, coupons, etc. which can be subsumed by the generic terms "applications" and "services". In the following description the term "application" will be used in a broad sense that comprises all contactless services and applications and particularly NFC services and applications.

A customer buys applications from Service Providers for instance by ordering them from the website of a Service Provider. In the course of the purchasing procedure the customer inputs a unique identification number of his/her mobile communication device, e.g. the telephone number of a NFC mobile phone, so that the Service Provider knows unambiguously where to send the application. The Service Provider transmits the purchased application to the customer's mobile communication device via a Trusted Service Manager which securely distributes and manages the Service Provider's applications and transmits them to the mobile communication device.

When the applications are received by the mobile communication device they are stored in a secure memory element of the mobile communication device and can be consumed by the customer by positioning the mobile communication device within the range of transmission of a reading device which reads and processes the application in an appropriate manner, e.g. by giving the user access to an entrance of a concert hall.

The present invention applies to a Mobile NFC ecosystem with Trusted Service Manager (TSM) as disclosed in the above referenced GSMA white book. Particularly, it takes into account the specific role of the TSM which acts as the single point of contact for the Service Providers to access their customer base through the MNOs and manages the secure download and life-cycle management of the Mobile NFC application on behalf of the Service Provider. However, while the GSMA white book defines the role of the TSM in theory, for successful applications in practice there are still a couple of obstacles and problems to overcome. The issue that has to be addressed by the present invention is that it would be desirable for a customer to share or resell applications being stored in his mobile communication device with other people like friends or relatives. While from a technical point of view this sharing or reselling of applications could be done directly by sending an application from one mobile communication device to another (by using Bluetooth, NFC, WIFI and so on) such a direct sharing would pose the following problems in the context of the concept of Trusted Service Managers. The first problem with sharing/reselling of an application is that this application which has been provided by a Service Provider (and maybe is still owned by it) might be specific to one particular customer or his/her mobile communication device, respectively, and therefore will not work on other mobile communication devices. The second problem to overcome for sharing/reselling of applications is that both the Service Provider and the Trusted Service Manager must be aware of the sharing/reselling of applications they are in charge of. The Service Provider (particularly, if it is still the owner of the application) must grant the right to the customer to do so. It has also been taken into account that a Service Provider should have the technical possibility to charge the customer for sharing/reselling an application.

OBJECT AND SUMMARY OF THE INVENTION

It is an object of the invention to provide a mechanism to share or resell applications like NFC services among customers and their mobile communication devices, respectively, without violating the concept of a Trusted Service Manager to be the single point of contact for the Service Providers to access their customer base through Mobile Network Operators and to manage the secure download and life-cycle management of the applications on behalf of the Service Providers.

In order to achieve the object defined above, with a method according to the invention characteristic features are provided so that a method according to the invention can be characterized in the way defined below, that is:

A method for sharing or reselling applications being stored in a source mobile communication device with or to a destination mobile communication device comprising:

at the source mobile communication device, transmitting a sharing or reselling request to a Trusted Service Manager which request comprises information about the application to be shared/resold and the destination mobile communication device;

at the Trusted Service Manager, extracting from the request the application to be shared/resold and the destination communication device; connecting to a repository that contains information about applications associated with mobile communication devices in which the applications are installed and with the Service Providers which have provided said applications; retrieving from the repository the Service Provider that has provided the application to be shared/resold; and sending a query to said Service Provider asking if reselling or sharing the application with/to the destination mobile communication device is possible;

at the Service Provider, processing said query by checking whether reselling or sharing the application with/to destination mobile communication device is possible or not, and in the affirmative, sending an installation request to the Trusted Service Manager which installation request comprises an adapted version of the application to be shared/resold, and sending update instructions to the Trusted Service Manager instructing it how to proceed with the application to be shared/resold in the source mobile communication device;

at the Trusted Service Manager, compiling the adapted application into a setup-message and sending it to the destination mobile communication device; sending update instructions to the source mobile communication device; and updating the repository according the Service Provider's installation instructions and update instructions;

at the destination mobile communication device, installing the application according to the setup-message;

at the source mobile communication device, updating the stored application according to the update instructions.

In order to achieve the object defined above, with a telecommunication system according to the invention characteristic features are provided so that a telecommunication system according to the invention can be characterized in the way defined below, that is:

A telecommunication system comprising at least one Service Provider, at least one Trusted Service Manager and a plurality of mobile communication devices, e.g. NFC mobile phones, being equipped to store applications provided by the Service Providers, wherein the Service Providers, the Trusted Service Manager and the mobile communication devices comprise computing units and software code portions for performing the steps of the above method.

In order to achieve the object defined above, with a Trusted Service Manager according to the invention characteristic features are provided so that a Trusted Service Manager according to the invention can be characterized in the way defined below, that is:

A Trusted Service Manager being adapted to:

receive from a source mobile communication device a sharing or reselling request which request comprises information about an application to be shared/resold and a destination mobile communication device;

extract from the request the application to be shared/resold and the destination communication device;

connect to a repository that contains information about applications associated with mobile communication devices in which the applications are installed and with Service Providers which have provided said applications;

retrieve from the repository the Service Provider that has provided the application to be shared/resold;

send a query to said Service Provider asking if reselling or sharing the application with/to the destination mobile communication device is possible;

compile an adapted application received from the Service Provider into a setup-message and send it to the destination mobile communication device;

send update instructions to the source mobile communication device according the Service Provider's SPx installation instructions; and update the repository according the Service Provider's installation instructions and update instructions.

In order to achieve the object defined above, with a Service Provider according to the invention characteristic features are provided so that a Service Provider according to the invention can be characterized in the way defined below, that is:

A Service Provider being adapted to provide applications via a Trusted Service Manager to mobile communication devices, wherein the Service Provider is further adapted to:

receive a query from the Trusted Service Manager asking if reselling or sharing the application with/to a destination mobile communication device is possible;

process said query by checking whether reselling or sharing the application with/to destination mobile communication device is possible or not, and in the affirmative, send an installation request to the Trusted Service Manager which installation request comprises an adapted version of the application to be shared/resold, and send update instructions to the Trusted Service Manager instructing it how to proceed with the application to be shared/resold in a source mobile communication device.

In order to achieve the object defined above, with a computer program product according to the invention characteristic features are provided so that a computer program product according to the invention can be characterized in the way defined below, that is:

A computer program product being directly loadable into the memory of a mobile communication device being equipped with a memory device for storing applications which have been provided to the mobile communication device by Service Providers, wherein the computer program product comprises software code portions for performing—when running on the mobile communication device—the steps of transmitting a sharing or reselling request to a Trusted Service Manager which request comprises information about an application to be shared/resold and a destination mobile communication device;

installing applications in the memory device according to a setup-message of a Trusted Service Manager; and updating application that are stored in the memory device according to update instructions of a Trusted Service Manager.

In order to achieve the object defined above, a mobile communication device according to the invention comprises an arithmetic-logic unit and a memory and processes the computer program product according to the above paragraph.

The characteristic features according to the invention provide the advantage that a customer of a Service Provider is enabled to share or resell applications like NFC services that he/she has installed in his/her mobile communication device with other customers and their mobile communication devices, respectively, without violating the concept of a Trusted Service Manager to be the single point of contact for the Service Providers to access their customer base through Mobile Network Operators.

The measures as claimed in claim 2, claim 3, claim 5 or claim 6, respectively, provide the advantage that they rely on well-defined highly accessible network infrastructure and services.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
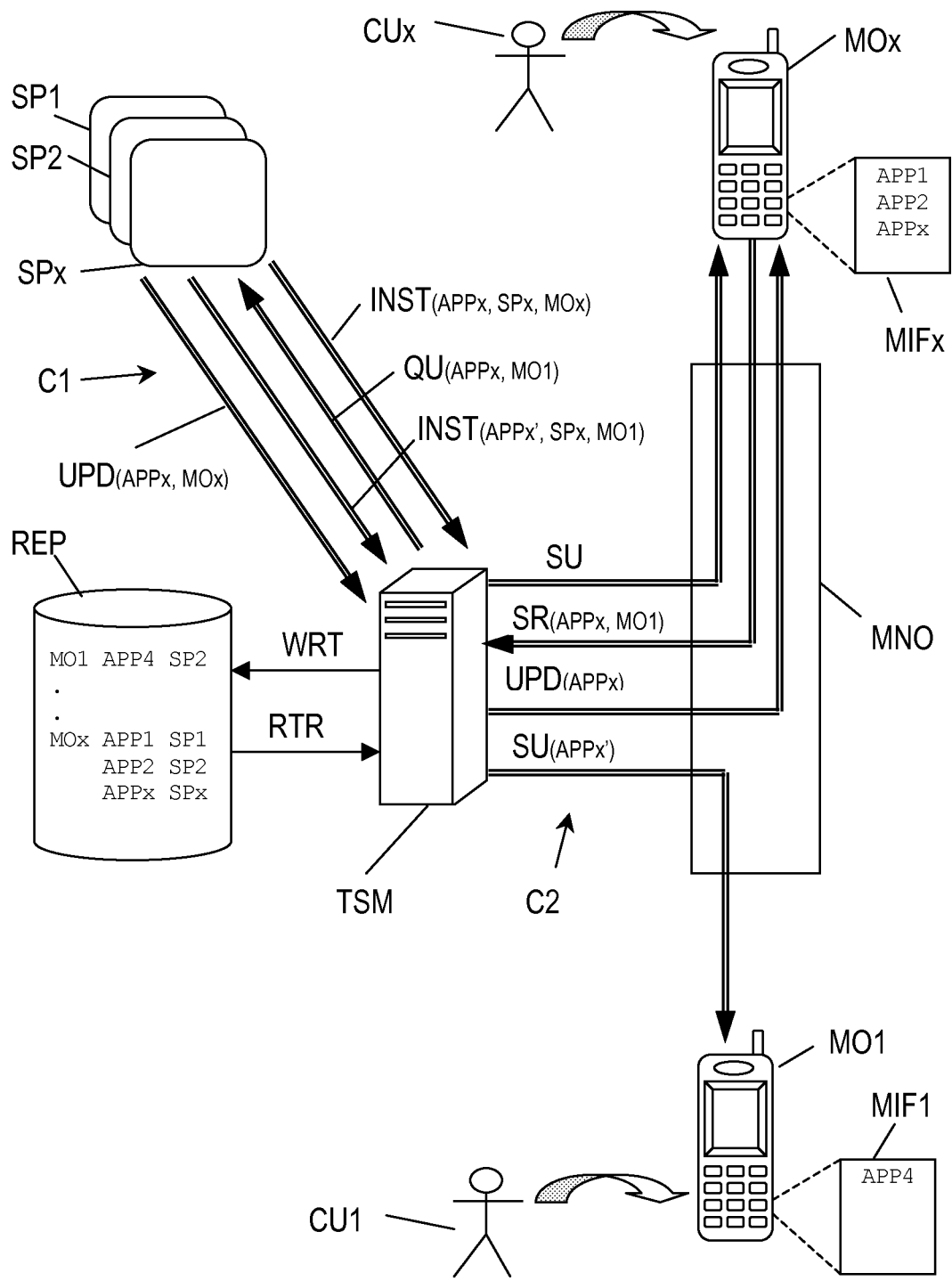
FIG. 1 shows a schematic diagram of a telecommunication system in which context the invention is embedded as well as the steps of the method according to the present invention.

FIG. 1 schematically shows a Mobile NFC ecosystem as disclosed in the above referenced GSMA white book. The system comprises a Mobile Network Operator MNO, a couple of Service Providers SP1, SP2, SPx, mobile communication devices MO1, MOx and a Trusted Service Manager TSM. The mobile communication device MO1 is assigned to a customer CU1 who has registered the mobile communication device MO1 at the Mobile Network Operator MNO. The mobile communication device MOx is assigned to a customer CUx who has registered the mobile communication device MOx at the Mobile Network Operator MNO. The Mobile Network Operator MNO provides the full range mobile services to the customers CU1, CUx and their mobile communication devices MO1, MOx, respectively, particularly provides UICC and NFC terminals plus Over The Air (OTA) transport services for the mobile communication devices MO1, MOx. The mobile communication devices MO1, MOx are equipped with memory devices MIF1, MIFx being adapted to securely store applications APP1, APP2, APPx in memory device MIFx and APP4 in memory device MIF1. The memory devices MIF1, MIFx advantageously comprise MIFARE memory cards (e.g. a MIFARE Standard 1 k memory card as shown in FIG. 1) or smartcards like SmartMX cards. The mobile communication devices MO1, MOx equipped with said memory devices MIF1, MIF2 are preferably configured as NFC mobile phones. For instance, the application APP1 is provided by Service Provider SP1, the applications APP2 and APP4 are provided by Service Provider SP2, and the application APPx is provided by the Service Providers SPx. The Service Providers SP1, SP2, SPx are e.g. banks, public transport companies, loyalty programs owners etc.

The Trusted Service Manager TSM securely distributes and manages the Service Providers' SP1, SP2, SPx applications APP1, APP2, APP4, APPx to the Mobile Network Operator's MNO customer base as will be explained in more detail below.

When a Service Provider, e.g. Service Provider SPx wants to install a new application APPx (ticket, access control, coupon, etc.) in a memory device MIFx of the mobile communication device MOx it sends an installation request INST via a first communication channel C1 to the Trusted Service Manager TSM. The installation request INST comprises the application APPx to be installed, an identifier of the Service Provider SPx and a unique identifier of the target mobile communication devices MOx, e.g. an assigned telephone number. The first communication channel C1 is e.g. configured as a computer network such as the Internet. In the present example the preferred data transmission protocol between the Service Provider SPx and the Trusted Service Manager TSM is HTTPS. Usually, the Service Provider SPx has got the unique identifier of the mobile communication device MOx directly from the customer CUx, e.g. when he orders a ticket (=Application APPx) via the website of the Service Provider SPx and in order to complete this order has to input the telephone number of his mobile communication device MOx into an online-form.

As the Trusted Service Manager TSM receives the installation request INST from the Service Provider SPx it extracts the application APPx and the identifier of the mobile communication device MOx and—provided that the memory device MIFx of the mobile communication device MOx is a MIFARE memory—assigns under its own discretion one or more destination sectors and the associated sector key(s) of the memory device MIFx. Next, the Trusted Service Manager TSM compiles the application APPx, the sector key(s) and the sector number(s) of the destination sectors into a setup-message SU. In order to improve security the Trusted Service Manager TSM may encrypt the setup-message SU. Then the Trusted Service Manager TSM sends the setup-message SU via a second communication channel C2, e.g. an over-the-air (OTA) service of the Mobile Network Operator MNO to the mobile communication device MOx. Presently, the preferred OTA service is SMS. In the mobile phone MOx there is a software application running being designed to extract all the data from the received setup-message SU, if necessary decrypting it first, and writing the extracted application APPx into the assigned destination sector(s) of the memory device MIFx by using the extracted sector key(s).

Further, as the Trusted Service Manager TSM receives the installation request INST from the Service Provider SPx and extracts the application APPx and the identifier of the mobile communication device MOx it further writes (WRT) these data into a repository REP so that it can retrieve all Service Providers SPx that are associated with a specific mobile communication device MOx. The repository REP shown in FIG. 1 presently contains one application APP4 assigned to the mobile communication device MO1, which application APP4 has been delivered by the Service Provider SP2, and three applications APP1, APP2, APPx assigned to the mobile communication device MOx, which applications have been delivered by the Service Providers SP1, SP2 and SPx, respectively. The repository REP could for instance be configured as a data base, a file system or the like.

According to the present invention when the customer CUx wants to share or resell e.g. the application APPx with the customer CU1 he/she selects the application APPx and the destination mobile communication device MO1 of the customer CU1 (e.g. either by inputting a sequence of key strokes or by selection from menus of the user interface of the mobile communication device MOx) and gets his/her mobile communication device MOx to send a request SR to the Trusted Service Manager TSM to share/resell the application APPx with the mobile communication device M01. The Trusted Service Manager TSM retrieves (RTR) the application APPx for finding out by which Service Provider it has been provided (in the present example Service Provider SPx) and sends a query QU to the Service Provider SPx asking if reselling or sharing the application APPx with/to destination mobile communication device MO1 is possible. If the Service Provider SPx agrees it sends an installation request INST comprising an adapted version APPx' of the original application, its own identifier (i.e. SPx) and the unique identifier of the target mobile communication device MO1. Further, the Service Provider sends update instructions UPD to the Trusted Service Manager TSM instruction how to proceed with the application APPx in the source mobile communication device MOx. Update instructions comprise e.g. the instruction to delete the application APPx from the source mobile communication device MOx or to update a value (e.g. number of remaining tickets) that is contained in the application APPx.

The Trusted Service manager TSM updates its repository REP according the Service Provider's SPx instructions. The Trusted Service manager TSM further compiles the adapted application APPx', and if necessary sector key(s) and target the sector number(s) of the memory device MIF1 into a setup-message SU and sends it via the Mobile Network Operator MNO to the destination mobile communication device MO1. The Trusted Service manager TSM also sends the update instructions UPD via the Mobile Network Operator MNO to the source mobile communication device MOx.

Figure 2:
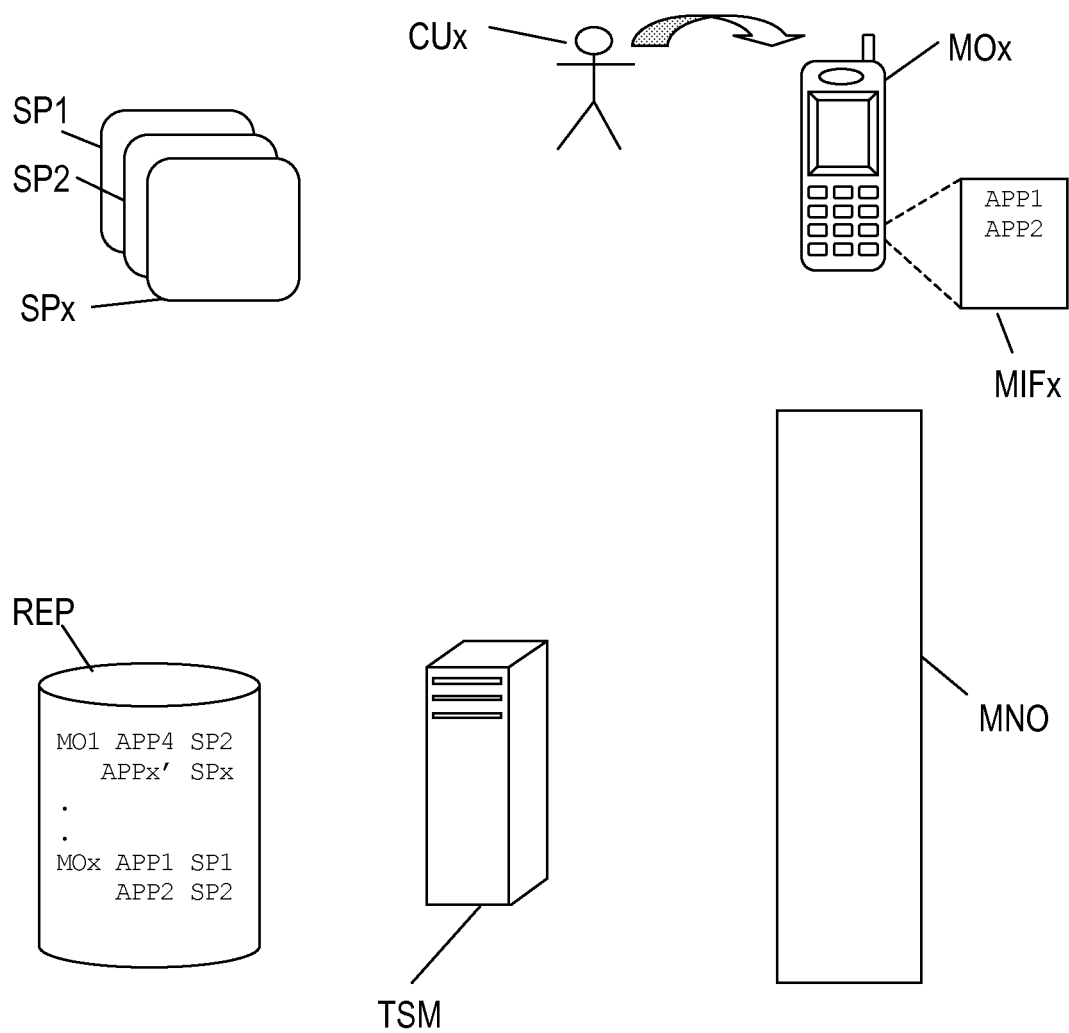
FIG. 2 shows a schematic diagram of the status of the telecommunication system when the steps of the method according to the invention have been completed.

FIG. 2 shows the state of the Mobile NFC ecosystem after the sharing/reselling request has been completed. It is assumed that the uptdate instructions had been deleting instructions. It can be seen that application APPx has been deleted from the memory device MIFx of the source mobile communication device MOx and that adapted application APPx' has been stored in the memory device MIF1 of the destination mobile communication device MOx. Further, the information in the repository has been updated accordingly.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for sharing or reselling at least one application being stored in a source mobile communication device with or to a destination mobile communication device, comprising:

transmitting by the source mobile communication device a sharing or reselling request to a Trusted Service Manager server, wherein the sharing or reselling request comprises information relating to the application to be shared/resold and the destination mobile communication device;

extracting, by the Trusted Service Manager server, from the request, information relating to the application to be shared/resold and the destination mobile communication device;

connecting the Trusted Service Manager server to a first repository that contains information relating to the at least one application associated with at least one mobile communication device in which the at least one application is to be installed and with at least one Service Provider server which provides said at least one application;

retrieving, by the Trusted Service Manager server, from the first repository, information relating to the Service Provider that provides the application to be shared/resold; and sending, by the Trusted Service Manager server, a query to said Service Provider asking if reselling or sharing the application with/to the destination mobile communication device is possible;
processing, by the Service Provider server, said query by checking whether reselling or sharing the application with/to the destination mobile communication device is possible or not, and only when reselling or sharing the application with/to the destination mobile communication device is possible, sending an installation request to the Trusted Service Manager server, the installation request comprising an adapted version of the application to be shared/resold, and
sending from the Service Provider server update instructions to the Trusted Service Manager server instructing the Trusted Service Manager server how to proceed with the application to be shared/resold in the source mobile communication device;
compiling, by the Trusted Service Manager server, the adapted version of the application into a setup-message,
sending from the Trusted Service Manager server, the compiled adapted version of the application to the destination mobile communication device,
sending from the Trusted Service Manager server update instructions to the source mobile communication device, and
updating, by the Trusted Service Manger server, the repository according to the installation request and update instructions received from the Service Provider server;
installing, on the destination mobile communication device, the adapted version of the application according to the setup-message;
updating the stored application on the source communication device according to the update instructions.

2. The method as claimed in claim 1, wherein the at least one Service Provider and the Trusted Service Manager communicate with each other via a computer network according to a data transmission protocol, wherein the data transmission protocol is HTTPS.

3. The method as claimed in claim 1, wherein the Trusted Service Manager communicates with the mobile communication devices via an Over-The-Air service of a Mobile Network Operator, wherein the Over-The-Air service is Short Message Service.

4. A telecommunication system comprising:
at least one Service Provider server, at least one Trusted Service Manager server, and a plurality of mobile communication devices,
the mobile communication devices comprising memory device storing at least one application provided by the at least one Service Provider,
the source mobile communication device, is configured to transmit a sharing or reselling request to a Trusted Service Manager server, the sharing or reselling request comprising information relating to the application to be shared/resold and the destination mobile communication device;
the Trusted Service Manager is configured to:
extract from the request information relating to the application to be shared/resold and the destination mobile communication device;
connect to a first repository that contains information about the at least one application associated with mobile communication device in which the at least one application is to be installed and with at least one Service Provider which provides said at least one application;
retrieve from the first repository information relating to the Service Provider that provides the application to be shared/resold; and
send a query to said Service Provider asking if reselling or sharing the application with/to the destination mobile communication device is possible;
the Service Provider is configured to:
process said query by checking whether reselling or sharing the application with/to the destination mobile communication device is possible or not, and only when reselling or sharing the application with/to the destination mobile communication device is possible,
send an installation request to the Trusted Service Manager, the installation request comprising an adapted version of the application to be shared/resold, and
send update instructions to the Trusted Service Manager instructing the Trusted Service Manager how to proceed with the application to be shared/resold in the source mobile communication device;
the Trusted Service Manager server is configured to:
compile the adapted version of the application into a setup-message,
send the compiled adapted version of the application to the destination mobile communication device;
send update instructions to the source mobile communication device; and
update the repository according the Service Provider's installation instructions and update instructions;
the destination mobile communication device is configured to:
install the application according to the setup-message;
the source mobile communication device is configured to:
update the application stored in the memory device according to the update instructions.

5. The system as claimed in claim 4, wherein the at least one Service Provider and the at least one Trusted Service Manager comprise means for communicating with each other via a computer network according to a data transmission protocol, wherein the data transmission protocol is HTTPS.

6. The system as claimed in claim 4, wherein the at least one Trusted Service Manager comprises means for communicating with the mobile communication devices via an Over-The-Air service of a Mobile Network Operator, wherein the Over-The-Air service is Short Message Service.

* * * * *